(12) United States Patent
Pritschins et al.

(10) Patent No.: US 9,085,654 B2
(45) Date of Patent: Jul. 21, 2015

(54) WETTING AGENTS AND DISPERSANTS, THEIR PREPARATION AND USE

(75) Inventors: Wolfgang Pritschins, Wesel (DE);
Jurgen Omeis, Dorsten-Lembeck (DE);
Hans-Josef Teuwsen, Uedem (DE)

(73) Assignee: BYK-Chemie GmbH (DE)

( * ) Notice: Subject to any disclaimer, the term of this patent is extended or adjusted under 35 U.S.C. 154(b) by 281 days.

(21) Appl. No.: 12/863,804

(22) PCT Filed: Feb. 19, 2009

(86) PCT No.: PCT/EP2009/001216
§ 371 (c)(1),
(2), (4) Date: Oct. 12, 2010

(87) PCT Pub. No.: WO2009/103543
PCT Pub. Date: Aug. 27, 2009

(65) Prior Publication Data
US 2011/0021699 A1    Jan. 27, 2011

(30) Foreign Application Priority Data

Feb. 22, 2008  (DE) .......................... 10 2008 010 705

(51) Int. Cl.
*C08G 18/00* (2006.01)
*C08G 18/28* (2006.01)
*C08G 18/48* (2006.01)

(52) U.S. Cl.
CPC .......... *C08G 18/283* (2013.01); *C08G 18/2875* (2013.01); *C08G 18/4825* (2013.01); *C08G 18/4833* (2013.01)

(58) Field of Classification Search
CPC ............. C08G 18/283; C08G 18/2835; C08G 18/2875
USPC .............................. 528/49, 53, 54, 68, 76, 85
See application file for complete search history.

(56) References Cited

U.S. PATENT DOCUMENTS

| 4,647,647 A | 3/1987 | Haubennestel et al. |
| 4,762,752 A | 8/1988 | Haubennestel et al. |
| 4,929,705 A * | 5/1990 | Mazanek et al. ................ 528/49 |
| 4,942,213 A | 7/1990 | Haubennestel et al. |
| 5,910,556 A * | 6/1999 | Wamprecht et al. ............ 528/49 |
| 5,969,002 A | 10/1999 | Kijlstra et al. |
| 7,288,591 B2 | 10/2007 | Carlson et al. |
| 7,741,404 B2 | 6/2010 | Richards et al. |
| 8,362,300 B2 | 1/2013 | Pritschins et al. |
| 8,492,499 B2 | 7/2013 | Haubennestel et al. |
| 2004/0242727 A1 | 12/2004 | Carlson et al. |
| 2004/0260013 A1 | 12/2004 | Richards |
| 2005/0004284 A1 | 1/2005 | Koenemann et al. |
| 2008/0167423 A1 * | 7/2008 | Richards et al. .............. 524/589 |

FOREIGN PATENT DOCUMENTS

| CA | 2170949 A1 | 9/1996 |
| CN | 1805985 B | 7/2006 |
| DE | 19636382 A1 | 3/1998 |
| DE | 10159315 A1 | 6/2003 |
| DE | 102004022753 B3 | 2/2006 |
| EP | 0154678 A1 | 9/1985 |
| EP | 0318999 A2 | 6/1989 |
| EP | 0335197 A1 | 10/1989 |
| EP | 0731148 A2 | 9/1996 |
| EP | 0826753 A1 | 3/1998 |
| EP | 1593700 B1 | 11/2006 |
| JP | 2005504140 A | 2/2005 |
| JP | 2005325356 A | 11/2005 |
| JP | 2007502903 A | 2/2007 |
| JP | 2007254742 A | 10/2007 |
| WO | WO-97/26984 A1 | 7/1997 |
| WO | WO-2004/104064 A1 | 12/2004 |
| WO | WO-2006/132910 A2 | 12/2006 |

OTHER PUBLICATIONS

"International Application Serial No. PCT/EP2009/001216, International Preliminary Report on Patentability mailed Sep. 16, 2010", (including English Translation of Written Opinion), 10 pgs.
"International Application No. PCT/EP2009/001216, International Search Report and Written Opinion issued May 29, 2009", 14 pgs.

* cited by examiner

*Primary Examiner* — Michael L Leonard
(74) *Attorney, Agent, or Firm* — Schwegman Lundberg & Woessner, P.A.

(57) ABSTRACT

The invention relates to addition compounds and their salts that comprise polypropylene oxide structures, characterized in that the addition compounds are obtainable by reacting (a) one or more polyisocyanates having at least two isocyanate groups per molecule with (b1) one or more compounds of the formula Y—XH, (b2) optionally one or more compounds of the formula G-(XH)$_n$, (c1) one or more compounds of the general formula Z-Q and (c2) optionally one or more compounds of the general formula M-Q. The invention further relates to the preparation of the addition compounds and to their use as dispersants, wetting agents and dispersion stabilizers, and also to solids coated with the addition compounds.

22 Claims, No Drawings

WETTING AGENTS AND DISPERSANTS, THEIR PREPARATION AND USE

PRIORITY CLAIM TO RELATED APPLICATIONS

This application is a national stage application under 35 U.S.C. §371 of PCT/EP2009/001216, filed Feb. 19, 2009, and published as WO 2009/103543 A1 on Aug. 27, 2009, which claims priority to German Application No. 10 2008 010 705.0, filed Feb. 22, 2008, which applications and publication are incorporated herein by reference and made a part hereof in their entirety, and the benefit of priority is claimed thereto.

The present invention relates to addition compounds and salts thereof that are suitable as wetting agents and dispersants and as dispersion stabilizers. The invention further relates to processes for preparing these addition compounds, to their use as wetting agents and dispersants and dispersion stabilizers for organic and inorganic pigments and also fillers in organic and aqueous systems, and to pulverous or fibrous solids coated with such wetting agents and dispersants and amenable to incorporation into liquid systems.

In solution or dispersion in a liquid, wetting agents lower the surface tension or interface tension and in that way increase the wetting capacity of the solution. Dispersants are suitable in general for stabilizing particulate solids in binders, paints, pigment pastes, plastics and plastics blends, for reducing the viscosity of such systems, and for improving the flow properties. Dispersion stabilizers are suitable in general for stabilizing dispersions that have already been produced.

In order to be able to incorporate solids into liquid media, high mechanical forces are necessary. It is usual to use dispersants in order to lower the dispersing forces and in order to minimize the total input into the system of energy needed to deflocculate the particulate solids, and hence also to minimize the dispersing time. Dispersants of this kind are surface-active substances of anionic, cationic or neutral structure. These substances, in a small amount, are either applied directly to the solid or added to the dispersing medium. It is also known that, following complete deflocculation of the agglomerated solids into primary particles, after the dispersing operation, there are also instances of reagglomeration, thereby completely or partly nullifying the dispersing effort. As a consequence of the inadequate dispersing and/or as a result of reagglomeration there are unwanted effects, such as viscosity increase in liquid systems, shade drift and losses of gloss in paints and coatings, and a reduction of mechanical strength in plastics.

A multiplicity of different substances are nowadays used as dispersants for pigments and fillers. Besides simple compounds of low molecular mass, such as lecithin, fatty acids and their salts, and alkylphenol ethoxylates, for example, complex structures, too, are used as dispersants. Such structures especially include amino-functional and amide-functional systems, which find broad use within the dispersants. In EP 158 406 and EP 208 041 use is made, for example, for the purpose of dispersing pigments, of amino- and amide-functional poly- and oligocopolymers based on polyamines and polycaprolactones, in which all the reactive amino groups have been converted into amide groups. These products, however, constitute complex reaction mixtures which are difficult to reproduce and have very poor solubilities in solvents and inadequate compatibilities with binders and other resins.

Good results can already be achieved with polymeric dispersants based on polyisocyanates, as are described for example in EP 0 154 678 A1 or EP 0 318 999 A2.

EP 0 154 678 A1 describes dispersants which are obtained by addition of monohydroxy compounds with polyisocyanates. The monohydroxy compounds contain at least one aliphatic, cycloaliphatic or aromatic group of at least one —O— and/or —COO— group. The monohydroxy compounds are preferably polyesters. In particular, polyesters formed from aliphatic lactones and aliphatic monoalcohols are employed. As a further compound for addition with polyisocyanates it is preferred to use di- or trifunctional polyethylene glycols.

In EP 0 318 999 A2 the addition compounds known from EP 0 154 678 A1 were modified by the additional incorporation of silicone-containing and/or urethane-containing groups. The resultant dispersants have more universal compatibility.

WO 2006/132910 A2 describes polyurethane-based dispersants which are composed of a linear polyurethane main chain with various possible side chains. The compounds described are characterized in that they contain at least one or, preferably, two or more reactive carbon-carbon double bonds per molecule. Consequently the compounds, after the dispersing operation, can be crosslinked either through Michael addition of polyamines or else through free-radical reaction.

EP 0 335 197 A1 discloses polyisocyanate polyaddition compounds which act as dispersants. They are prepared using, among other components, polyesters or, in particular, polyethylene oxides.

EP 0 731 148 A2 discloses the use of polyisocyanate addition products which contain hydrophilic polyether chains as suitable dispersants for the incorporation of solids into aqueous coating materials. The dispersants are prepared from the reaction of 5-100 equivalent-% (based on the isocyanate groups of the isocyanate component) of a monohydric alcohol component (B) and also, where appropriate, three further, optional components with a polyisocyanate. The monohydric alcohol component (B) is composed of at least one monohydric polyether alcohol having an ethylene oxide unit content of 50% to 99.5% by weight, which may be modified by addition reaction with epsilon-caprolactone in an amount of up to 40% by weight, based on the weight of the monohydric alcohol.

In EP 0 826 753 A1, dispersants comparable with those of EP 0 731 148 A2 are prepared in a solvent-free way. In this case, as a difference, 0 to 75 equivalent-% of the ethylene oxide-based monofunctional polyether component (B), where appropriate with modification with epsilon-caprolactone, is used. In addition there may be three further, optional components reacted with the isocyanate component. The polymers of the pigment formulation that are disclosed in EP 0 827 973 A1 also contain high fractions of ethylene oxide in the polyalkylene oxide fraction.

WO 1997/26984 A1 describes reaction products of polyisocyanates with a component Y—R—X. In the component Y—R—X the hydroxyl- or amino-functional group X is attached via the bridge R to a nitrogen-containing heterocycle Y in such a way that a nitrogen atom of the heterocycle forms a tertiary amine with the bridge R. The addition of the tertiary amines Y—R—X with polyisocyanates produces dispersants which are used in compositions with high solids content.

US 2004/0242727 A1 discloses special radiation-curable dispersants for producing tack-free inks and coatings. The compounds in question are the reaction products of polyisocyanates with at least one radiation-curable component, preferably with (meth)acrylates, especially polycaprolactone acrylates, and one or more further components.

US 2004/0260013 A1 discloses dispersants with acidic groups which are composed of a linear polyurethane backbone of low molecular mass diisocyanates with side chains composed of poly($C_2$-$C_4$)alkylene oxides. Of the alkylene oxide side chains, at least 60%, preferably 70% or even 80% by weight, based on the total weight of the alkylene oxides, must have been synthesized from ethylene oxide units.

DE 101 59 315 A1 describes dispersants which are obtainable from diisocyanates and which contain an alkyl-capped oligoalkylene oxide radical. The oligoalkylene oxide radical necessarily comprises one or more ethylene oxide groups and may in addition also contain a further, branched alkyl radical, although this is not preferred.

WO 2004/104064 A2 concerns a dispersant comprising low molecular mass diisocyanates for non-aqueous systems, said dispersant being composed of a linear polyurethane backbone with polyester, polyether and/or polyacrylate side chains.

But the dispersants presented above often represent only partial solutions to the problems depicted at the outset. On account of numerous possible side reactions in the course of their preparation, many of these products represent very complex and poorly defined reaction mixtures, with the resulting disadvantages, such as very restricted compatibilities and poor solubilities. Consequently these reactions can be carried out only in highly dilute solutions, and the end products have very low solids contents of, in general, below 50% and in many cases even only 20-30%. The large quantities of solvent that are consequently introduced by way of these products, however, lead to considerable problems in modern coating systems, since, as part of the ongoing efforts to produce environmentally compatible systems, there is a need to reduce the amount of solvent as far as possible (e.g. in the case of pigment concentrates, high-solids and ultra-high-solids coatings), or even to abandon organic solvents entirely. Products which contain polyester radicals based on hydroxycarboxylic acids and/or their lactones, such as epsilon-caprolactone and/or delta-valerolactone, are problematic on account of their crystallization tendency, and exhibit problems with poor solubility and compatibility. Particularly in the case of decorating paints based on aromatic-free white spirits, the dispersants of the prior art can be used either not at all or only with restrictions, owing to poor compatibility.

In view of the multiplicity of organic and inorganic pigments and filling materials that are used today, sufficient stabilization of the particulate solids to be dispersed, by desorption-stable occupancy of the surface, is not adequately ensured. Consequently there are instances of agglomeration, since the efficient steric shielding that is necessary is lacking.

On account of the high quantities of such dispersants that are used, relative to the solids to be dispersed (in the case of carbon black, up to 100% of dispersant relative to pigment), it is frequently the case in the finished coating film that there are impairments affecting the intercoat adhesion and the resistance properties, especially water resistance, solvent resistance and scratch resistance.

The present invention is therefore based on the object of eliminating the above-described disadvantages of known dispersants, in other words of developing additives which, while effectively stabilizing pigments or fillers, lower the millbase viscosity of the paints, pastes or plastics formulations to an extent such that processing with a high degree of filling is possible, without detriment to the resistance properties of the cured coatings. At the same time, especially in the case of pigment pastes and filler pastes, a broad compatibility must be ensured, so that they can be used in many different binders and coating materials. Furthermore, it is necessary for the dispersing additives of the invention that are used to allow the pastes, or the binders prepared with these pastes, to be mixed with one another without flocculation.

A further aim is to provide dispersing additives which also act as wetting agents. Lastly, the additives provided ought also to act as dispersion stabilizers, especially as emulsion stabilizers.

Furthermore, the intention is that the addition compounds provided in accordance with the invention should solve the problems associated with the incorporation of lactones into the dispersants of the prior art. High fractions of lactone, especially caprolactone, frequently lead, as already described above, to partially crystalline compounds with a high viscosity, something which adversely affects the processing properties especially in the case of the production of pigment pastes and filler pastes. Such lactone-based dispersants also possess the solubility problems outlined above. Similar disadvantages are also known for dispersants which contain very high polyethylene oxide fractions.

These addition compounds, furthermore, are of surprisingly broad usefulness both in polar and in apolar binder systems. They strongly lower the viscosity of the millbase during dispersing and so make it possible to prepare formulations having a high solids fraction.

Surprisingly it has become apparent that a marked improvement in the resistance properties in conjunction with effective dispersing and stabilizing of pigments or filler particles in binders, pigment pastes or plastics formulations can be achieved if the addition compounds of the invention, described below, are used.

The objective is achieved through the provision of addition compounds and salts thereof which are obtainable by reacting (a) one or more polyisocyanates having at least two isocyanate groups per molecule with (b1) one or more compounds of the formula (Ia)

$$Y\text{—}XH \quad \text{(Ia)}$$

where

XH is a group that is reactive towards isocyanates and

Y is a monomeric or polymeric group that is not reactive towards isocyanates, that contains no tertiary amino groups and that comprises one or more aliphatic, cycloaliphatic and/or aromatic groups, the compound of the general formula (Ia) possessing a number-average molar mass $M_n$ of less than 20 000 g/mol and at least 55 mol % of the compounds of the formula (Ia) possessing a number-average molecular weight $M_n$ of 150 to 10 000 g/mol and which represent XH-functionalized polyalkylene oxides which contain 40 to 100 mol % of alkylene oxide units having at least three carbon atoms, based on the total amount of alkylene oxide units, with the proviso that 20% to 90% of the isocyanate groups of component (a) are reacted with the compounds of the formula (Ia), (b2) one or more compounds of the formula (Ib)

$$G\text{-}(XH)_n \quad \text{(Ib)}$$

where n is 2 to 4 and G is an aliphatic, cycloaliphatic and/or aromatic group which contains at least 2 carbon atoms, has no tertiary amino groups and has a number-average molecular weight $M_n$ of not more than 3000, and which can contain —O—, —COO—, —CONH—, —S— and/or —$SO_2$— groups, are reacted in an amount such that 0% to 60%, preferably 0 to 45% and more preferably 0 to 40% of the NCO groups of the polyisocyanates originally used are reacted, with the proviso that, as a result of the reactions (b1) and (b2), a total of at least 20% and not more than 90%, preferably 30 to 65% and more preferably 40 to 60% of the isocyanate groups of the polyisocyanates originally used have undergone reaction, and (c1) one or more compounds of the general formula (IIa)

$$Z\text{-}Q \qquad (IIa)$$

in which Q is —NH$_2$, —NHR or OH, in which R is a linear or branched alkyl group having 1 to 18 carbon atoms, and Z is an organic basic radical having at least one tertiary amino group and containing no isocyanate-reactive groups, and (c2) optionally one or more compounds of the general formula (IIb)

$$M\text{-}Q \qquad (IIb)$$

in which Q is —NH$_2$, —NHR or OH, in which R is a linear or branched alkyl group having 1 to 18 carbon atoms, and M is an organic radical having a number-average molar mass of not more than 1000 g/mol, with at least one tertiary amino group and at least one hydroxyl group, with the proviso that at least 10% of the isocyanate groups of component (a) are reacted with component (c1).

Component (a)

For preparing the addition compounds of the invention use is made as component (a) of polyisocyanates having at least two isocyanate groups per molecule. Isocyanates of this kind are known from the prior art in the present technical field.

The compounds in question are more preferably oligomeric or polymeric derivatives of monomeric diisocyanates that contain biuret, urethane, uretdione and/or isocyanurate groups. Monomeric diisocyanates of this kind are, for example, 1,4-diisocyanatobutane, hexamethylene diisocyanate (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, tolylene diisocyanate (TDI), 1-isocyanato-1-methyl-4(3)-isocyanatomethylcyclohexane, bis(isocyanatomethyl)norbornane and 1,3- and 1,4-bis(2-isocyanatoprop-2-yl)benzene (TMXDI) or mixtures of such diisocyanates. Alternatively, the stated monomeric isocyanates may be used as they are, alone or in a mixture, or in a mixture with their oligomeric or polymeric derivatives containing biuret, urethane, uretdione and/or isocyanurate groups. In accordance with the invention it is possible to use one or more monomeric, oligomeric or polymeric polyisocyanates.

The polyisocyanates must possess an average functionality of at least 2. The average functionality is preferably at least 2.5 and more preferably at least 3. Particular preference is given to the above-described derivatives of HDI, TDI and/or IPDI, and especially those of TDI.

Examples of polyisocyanates of this kind are those which are obtainable, for example, by addition of diisocyanates with polyols, such as Desmodur L from Bayer, or those obtainable by biuret reaction from diisocyanates, such as the commercial product Desmodur N from Bayer, or else the polyisocyanates with an isocyanurate parent structure that are obtainable by cyclization of diisocyanates, such as the commercial products Desmodur HL and Desmodur IL from Bayer, the commercial products Polurene KC or Polurene HR from SAPICI, or trimeric isophorone diisocyanate (isocyanurate T1890 from Chemische Werke Hüls). Further examples of polyisocyanates available as commercial products are Desmodur VL (polyisocyanate based on diphenylmethane diisocyanate (MDI), Bayer AG), Desmodur Z4370 (polyisocyanate based on isophorone diisocyanate (IPDI), Bayer AG), Desmodur N3400 (aliphatic HDI uretdione, Bayer AG), Thanecure T9 (aromatic TDI uretdione, TSE Industries), Crelan VP LS 2147 and Crelan VP LS 2347 (aliphatic IPDI uretdiones, Bayer AG), Polurene KD (polyisocyanurate based on tolylene diisocyanate (TDI), SAPICI), Uronal RA.50 (polyisocyanurate based on TDI, from Galstaff), Polurene A (polyisocyanate based on TDI trimethylolpropane (TMP), SAPICI), Polurene MC (polyisocyanate based on TMP-IPDI, SAPICI), Polurene MD.70 (polyisocyanate based on TMP-TDI-MDI, SAPICI). These commercial products are frequently not in the pure form of a polyisocyanate, but instead in the form of mixtures of polyisocyanates of similar structure. As polyisocyanates in the present invention it is preferred to use trimerization products—that is, products containing one or more isocyanurate groups—of diisocyanates based on hexamethylene diisocyanate (HDI), isophorone diisocyanate (IPDI) and/or tolylene diisocyanate (TDI).

By the abovementioned "average functionality of at least 2" is meant that in terms of the isocyanate groups the commercial products have the stated functionality of at least 2. "Functionality of 3", for example, means that a molecule contains on average 3 free isocyanate groups.

The average functionality can be determined experimentally by determining the number-average molecular weight $M_n$ and the NCO number as described in the example section of the present invention, and calculating therefrom the NCO equivalent weight. The average functionality is the ratio formed from the number-average molecular weight and the NCO equivalent weight. Preferably the average molecular weight of the polyisocyanates is at least 200, more preferably at least 300, very preferably at least 500. Preferably the average functionality is 2.5 to 10, more preferably at least 3, such as 3 to 6, for example.

Component (b1)

The polyisocyanates of component (a) are reacted in accordance with the invention with compounds of component (b1) of the above formula (Ia).

The compounds of the formula (Ia) are characterized in that they contain exactly one group XH that is reactive towards isocyanate groups. The compounds of the formula (Ia) react irreversibly via their reactive XH group with the isocyanates.

For the Y group of the compound of the general formula (Ia), it is the case that it is not reactive towards isocyanates, i.e. that they contain no active hydrogen atoms according to Zerewitinoff. This means in particular that the group Y is free from the abovementioned groups XH.

Examples of XH are OH, NH$_2$, NHR, SH or COOH, R being a branched or unbranched alkyl group having 1 to 18 carbon atoms. Preferably XH is OH, NH$_2$ or NHR. With particular preference these functional groups are hydroxyl groups, since these compounds are readily obtainable and/or available commercially and the resulting reaction products are highly soluble in solvents which are employed in the context of the later use of the additives in accordance with the invention.

The groups Y that are not reactive towards isocyanates may contain the heteroatoms O, S, Si and/or N and/or ether, urethane, carbonate, amide and/or ester groups. In the groups Y it is possible for halogen, preferably fluorine and/or chlorine, to be substituted for hydrogen.

As compounds of the formula (Ia) it is possible to use aliphatic, cycloaliphatic and/or araliphatic compounds. It is also possible to use mixtures of such compounds, in other words at least two different compounds of the formula (Ia). The aliphatic or araliphatic compounds of the formula (Ia) may be straight-chain or branched. They may be saturated or unsaturated. Saturated compounds are preferred, however.

Examples of compounds of the formula (Ia) are straight-chain or branched alcohols such as methanol, ethanol, butanol, ethylhexanol, decanol, isotridecyl alcohol, lauryl alcohol, stearyl alcohol, isobornyl alcohol, benzyl alcohol, propargyl alcohol, oleyl alcohol, linoleyl alcohol, oxo-process alcohols, neopentyl alcohol, cyclohexanol, fatty alcohols, alkylphenols, monophenyl diglycol, alkylnaphthols, phenylethanol, hydroxy-functional vinyl compounds such as, for example, hydroxybutyl vinyl ether, hydroxy-functional acrylates or methacrylates such as, for example, hydroxyethyl acrylate, hydroxyethyl methacrylate, hydroxybutyl (meth)acrylate, and also polyolefin polyols, such as unhydrogenated or hydrogenated, hydroxy-functional polybutadienes, polypropylenes, ethylene/butylene copolymers or polystyrenes having an average functionality of 1 to 3. Examples of corresponding commercial products are the hydroxy-terminated hydrogenated polybutadienes, available under the name Polytail® from Mitsubishi Chemical, or the hydroxy-terminated ethylene/butylene copolymers Kraton® Liquid L-1203, L-1302 and L-2203 from Kraton Polymers, or the liquid polybutadienes available as NISSO-PB from Nippon Soda Co., or the saturated, long-chain, linear, largely primary alcohols available from Baker Petrolite as Unilin® alcohols, having chain lengths of up to $C_{50}$ and molecular weights of 375 to 700 g/mol, and their ethoxylates, which are obtainable under the Unithox® name. Further examples are described inter alia in EP-A-154 678. Of the aforementioned hydroxy compounds, those containing no polymerizable double bonds are preferred.

As compounds of the formula (Ia) it is also possible to use those which contain ester, ether, urethane, carbonate, amide and/or siloxane groups or combinations of these groups. They may therefore, for example, be polyethers, polyesters, polyurethanes, polycarbonates, polysiloxanes or, for example, mixed polyether-polyesters.

Polyesters can be prepared for example by reacting dicarboxylic acids and also their esterifiable derivatives such as, for example, anhydrides, acid chlorides or dialkyl esters such as dimethyl esters or diethyl esters by reaction with diols and mono. The esterification may be carried out in bulk or else by means of azeotropic esterification in the presence of an entraining agent. Examples of dicarboxylic acids are succinic acid, maleic acid, fumaric acid, glutaric acid, adipic acid, sebacic acid, pimelic acid, phthalic acid or dimerized fatty acids and their isomers and hydrogenation products. Examples of diols are as follows: ethylene glycol, 1,2-propanediol, 1,3-propanediol, 1,4-butanediol, 1,6-hexanediol, neopentyl glycol, cis-1,2-cyclohexanedimethanol, trans-1,2-cyclohexanedimethanol, and also polyglycols based on ethylene glycol and/or propylene glycol.

Polyesters of the formula (Ia) may also be those which can be obtained by polycondensation of one or more, optionally alkyl-substituted, hydroxy carboxylic acids and/or ring-opening polymerization of the corresponding lactones such as propiolactone, valerolactone or caprolactone, for example, by means of a monohydroxy starter component, as described in EP-A-154 678 (U.S. Pat. No. 4,647,647). If used, preferably they possess a number-average molecular weight $M_n$ of 150 to 5000 g/mol. As a starter component it is possible in principle to use any compounds other than those given as compounds of the formula (Ia). The monofunctional alcohols used as starter components possess preferably 1 to 30, more preferably 4 to 14, carbon atoms. Mentioned by way of example are n-butanol, longer-chain, saturated and unsaturated alcohols, such as propargyl alcohol, oleyl alcohol, linoleyl alcohol, oxo-process alcohols, cyclohexanol, phenylethanol, neopentyl alcohol, ethylene glycol, propylene glycol and glycerol, but also fluorinated alcohols, hydroxy-functional polydialkylsiloxanes, hydroxy-functional vinyl compounds such as, for example, hydroxybutyl vinyl ether, hydroxy-functional acrylates or methacrylates such as, for example, hydroxyethyl acrylate, hydroxyethyl methacrylate, hydroxybutyl (meth)acrylate, and hydroxy-functional polyalkylene glycol acrylates and methacrylates. It is also possible to convert alcohols of the above-described kind and substituted and unsubstituted phenols, by alkoxylation in accordance with known processes, using alkylene oxides such as, for example, ethylene oxide, propylene oxide, butylene oxide and/or styrene oxide, into polyoxyalkylene monoalkyl, polyoxyalkylene monoaryl, polyoxyalkylene monoaralkyl and polyoxyalkylene monocycloalkyl ethers and to use these hydroxy polyethers in the manner described above as starter components for the lactone polymerization. In each case it is also possible to use mixtures of the aforementioned compounds, examples being lactone mixtures, of ε-caprolactone and δ-valerolactone, for example. The lactone polymerization is carried out by known methods, initiated by $BF_3$, p-toluenesulphonic acid or dibutyltin dilaurate, for example, at temperatures of about 70° C. to 180° C. Preferably, however, component (b1) contains less than 35 mol % of compounds of the formula (Ia) which contain copolymerized lactones or their hydroxycarboxylic acid analogues. With particular preference their fraction is less than 20 mol %. With very particular preference component (b1) contains no compounds of the general formula (Ia) that contain copolymerized lactones or their hydroxycarboxylic acid analogues.

Preferred compounds of the formula (Ia) are hydroxy-functional polyethers, hydroxy-functional polyesters, hydroxy-functional polyether-polyesters and/or aliphatic and/or cycloaliphatic alcohols having 2 to 30 carbon atoms, some of whose hydrogen atoms may have been replaced by halogen and/or aryl radicals.

As compounds of the formula (Ia) it is also possible to use monofunctional polysiloxanes such as, for example, monoamino- or monohydroxy-functional polydialkylsiloxanes containing hydroxyl groups not attached to silicon atoms, or to use aminoalkylpolysiloxanes, which where appropriate may have been polyether-modified and/or polyester-modified. In this case the respective amino-functional compounds carry primary or secondary, but not tertiary, amino groups. It is preferred to use hydroxyalkylpolydimethylsiloxanes having number-average molecular weights $M_n$ of 400 to 8000 g/mol, more preferably 400 to 5000 g/mol and very preferably 400 to 2000 g/mol.

As compounds of the formula (Ia) it is also possible to use polyurethanes, polyether-polyurethanes, polyester-polyurethanes and/or polyether-polyester-polyurethanes, which can be obtained by addition reaction of diisocyanates with dihydroxy compounds in the presence of monofunctional starter components.

As a diisocyanate for synthesizing the compounds of the formula (Ia) that contain urethane groups it is possible to use the aliphatic, cycloaliphatic and/or aromatic diisocyanates known per se from polyurethane chemistry and having 4 to 15 carbon atoms, such as tetramethylene, hexamethylene, trimethylhexamethylene, dodecamethylene, isophorone, tolylene and diphenylmethane diisocyanates, methylenebis(4-cyclohexyl isocyanate) or 1,4-cyclohexanebis(methyl isocyanate). As hydroxy compounds for synthesizing the compounds of formula (Ia) that contain urethane groups it is preferred to use diols having 2 to 12 carbon atoms, polyoxyalkylene glycols and dihydroxy-functional polyesters having preferred number-average molecular weights $M_n$ of not more than 2000 g/mol. As monohydroxy-functional starter component it is possible to use alcohols having up to 30 carbon atoms, such as already described for preparing the polyesters of formula (Ia), but also the hydroxy polyesters and hydroxy polyethers that are described as a compound of formula (Ia). The polyesters preferably have a number-average molecular weight $M_n$ of 300 to 5000 g/mol, and the polyethers one of 200 to 2000 g/mol.

The radical Y can also contain carbonate groups such as are obtained by reaction with open-chain and/or cyclic carbonates in accordance with the prior art. Suitability is possessed for example by carbonate-modified linear polyesters or polycarbonate diols such as are used in preparing polyurethane. Examples are described in U.S. Pat. No. 4,101,529, EP 0358 555, or WO 02/085507. Suitable carbonates are, for example, aliphatic, cycloaliphatic, araliphatic and/or aromatic esters of carbonic acid, such as dialkyl carbonates such as dimethyl carbonate, diethyl carbonate or diphenyl carbonate, for example, catechol carbonate or cyclic alkylene carbonates. Particular suitability is possessed by cyclic alkylene carbonates having 5- or 6-membered rings, which if desired may be substituted. Preferred substituents are aliphatic, cycloaliphatic and/or aromatic groups having up to 30 carbon atoms. Examples of suitable cyclic alkylene carbonates are ethylene carbonate, propylene carbonate, glyceryl carbonate, trimethylene carbonate, 4-methyltrimethylene carbonate, 5-methyltrimethylene carbonate, 5,5-dimethyltrimethylene carbonate, 5,5-diethyltrimethylene carbonate or 5-methyl-5-propyltrimethylene carbonate.

The radical Y may carry further groups which behave inertly during the formation of the adduct, such as, for example, the carboxamide group (—NHCO—), unactivated double bonds or urea moieties (—NHCONH—). The fraction of the compounds of the formula (Ia) that carry such groups should preferably be below 40 mol %, more preferably below 5 mol %, based on all of the compounds used of the formula (Ia). Particularly preferred compounds are those containing none of these groups at all.

The ester, ether, urethane, carbonate and/or siloxane groups that may be present can be in a block structure (for example poly(ethylene oxide-block-propylene oxide-block-epsilon-caprolactone), form a gradient or else be arranged randomly.

As a compound of the formula (Ia) it is also possible to use polyacrylic esters and/or polymethacrylic esters having on average one isocyanate-reactive group, such as are obtained by anionic, cationic or free-radical polymerization of acrylic esters and/or methacrylic esters. Preference is given to monohydroxy-functional compounds. Monohydroxy-functional polyacrylic esters and polymethacrylic esters are those containing on average one hydroxyl group in the molecule. Such compounds have already been used in this field of the art for preparing other dispersants, as are described for example in U.S. Pat. No. 4,032,698 or EP 318 999. Such polyacrylates have preferably a number-average molecular weight $M_n$ of 300 to 20 000 g/mol, more preferably 500 to 10 000 g/mol. They can be arranged in a block structure or else randomly or form a gradient.

The carboxyl group of the monomeric acrylates and/or methacrylates can be esterified with, for example, aliphatic, cycloaliphatic and/or aromatic alcohols such as methanol, butanol, cyclohexanol, 2-ethylhexanol, lauryl, stearyl, isobornyl or benzyl alcohol or with ether alcohols such as 2-methoxyethanol, 2-phenoxyethanol, tetrahydrofurfuryl alcohol, or glycidol, with polyester alcohols such as hydroxy-functional polycaprolactone, or with alkoxypolyalkylene glycols such as methoxypolyethylene glycol or methoxypolypropylene glycol. Methoxypolypropylene glycols are preferred as alkoxypolyalkylene glycols. The number-average molecular weight $M_n$ of the esterification component is preferably below 2000 g/mol. For preparing the hydroxy-functional polyacrylates and/or polymethacrylates it is also possible to use mixtures of different monomers described above. For preparing these polyacrylates and/or polymethacrylates it is also possible as comonomers to use vinyl esters such as vinyl acetate, vinyl ethers such as vinyl ethyl ether, styrene, vinyltoluene and/or vinylcyclohexane. The resulting copolymers have been synthesized from preferably not more than 50 mol % of comonomers that have no acrylic functionality.

Also possibly functioning as compound of the formula (Ia) are hydroxy-functional poly-2-alkyl-2-oxazolines or poly-2-alkyl-2-oxazines. Monohydroxy-functional compounds are used with preference. As the person skilled in the art is aware, poly-2-alkyl-2-oxazolines or poly-2-alkyl-2-oxazines are obtained by cationic, ring-opening polymerization of 2-alkyl-2-oxazolines or 2-alkyl-2-oxazines with initiators such as para-toluenesulphonic acid, methyl tosylate or methyl triflate, for example. The oxazolinium or oxazinium end groups that result from the living cationic polymerization mechanism can be converted by alkaline hydrolysis via amino ester end groups into the more stable hydroxy amides. An alternative route to the preparation of monohydroxy-functional poly-2-alkyl-2-oxazolines or poly-2-alkyl-2-oxazines is the polymerization with 2-(4-hydroxyphenyl)-N-methyl-2-oxazolinium trifluoromethanesulphonate as the initiating species (A. Groβ, G. Maier, O. Nuyken, Macromol. Chem. Phys. 197, 2811-2826 (1996)). Through the choice of the alkyl substituent it is possible to control the compatibility: for example, the water-solubility of poly-2-ethyl-2-oxazoline makes it suitable for highly polar systems, whereas poly-2-lauryl-2-oxazoline, for example, is compatible in apolar systems. Where block copolymers are formed from 2-ethyl-2-oxazoline and 2-lauryl-2-oxazoline, the polymers are notable for a particularly broad compatibility. Such poly-2-alkyl-2-oxazolines or poly-2-alkyl-2-oxazines possess preferably a number-average molecular weight $M_n$ of 300 to 20 000 g/mol, more preferably 500 to 10 000 g/mol.

As compounds of the formula (Ia) it is also possible to use mono-XH-functional polyalkylene oxides. These can be obtained, for example, by alkoxylating the other compounds described as compounds of the formula (Ia), such as alkanols, cycloalkanols, phenols or the above-described hydroxy polyesters, with alkylene oxides such as ethylene oxide, propylene oxide, butylene oxide, styrene oxide or mixtures thereof. In the case of mixed polyethers, they may be arranged randomly, as a gradient or in blocks. These polyethers advantageously have a number-average molecular weight ($M_n$) in the range from about 100 to 10 000, preferably from 150 to 5000 and more preferably from 200 to 3500 g/mol. Preference is given to polyethers based on ethylene oxide, propylene oxide, and also butylene oxide and mixtures thereof. Further preferred are monohydroxy-functional polyoxyalkylene monoalcohols such as allyl polyethers, for example Polyglycol A 350, Polyglycol A 500, Polyglycol A 1100, Polyglycol A 11-4, Polyglycol A 20-10 or Polyglycol A 20-20 from Clariant AG or Pluriol® A 010 R, Pluriol® A 11 RE, Pluriol® A 13 R, Pluriol® A 22 R or Pluriol® A 23 R from BASF AG, vinyl polyethers, for example Polyglycol V 500, Polyglycol V 1100 or Polyglycol V 5500 from Clariant AG, polyoxyethylene monoalcohols prepared starting from methanol, such as Pluriol® A 350 E, Pluriol® A 500 E, Pluriol® A 750 E, Pluriol® A 1020 E, Pluriol® A 2000 E or Pluriol® A 5010 E from BASF AG, polyoxypropylene monoalcohols prepared starting from alkanol, such as Polyglycol B01/20, Polyglycol B01/40, Polyglycol B01/80, Polyglycol B01/120 or Polyglycol B01/240 from Clariant AG or Pluriol® A 1350 P or Pluriol® A 2000 P from BASF AG, and polyalkoxylates started using different fatty alcohols and having a variable degree of alkoxylation, of the kind known to the skilled worker under the trade names Lutensol® A, Lutensol® AT, Lutensol® AO, Lutensol® TO, Lutensol® XP, Lutensol® XL, Lutensol® AP and Lutensol® ON from BASF AG. Preference is given to using polyoxyalkylene monoalcohols which contain ethylene oxide and/or propylene oxide and/or butylene oxide groups and which may have been modified with styrene oxide. Particular preference is given to using polyoxyalkylene monoalcohols such as, for example, Polyglycol B 11/50, Polyglycol B 11/70, Polyglycol B 11/100, Polyglycol B 11/150, Polyglycol B 11/300 or Polyglycol B 11/700 from Clariant AG, Pluriol® A 1000 PE, Pluriol® A 1320 PE, or Pluriol® A 2000 PE from BASF AG or Terralox WA 110 from DOW Chemicals, which are polyoxyalkylenes prepared starting from butanol, formed from ethylene oxide and propylene oxide, and with a terminal OH group. Of the aforementioned compounds, preference is given to those which contain no polymerizable double bonds.

Component (b1) must contain at least 55 mol %, preferably at least 75 mol % and more preferably 100 mol % of compounds of the general formula (Ia) which are XH-functionalized polyalkylene oxides and which possess a number-average molecular weight $M_n$ of 150 to 10 000 g/mol, preferably at least 300 g/mol, more preferably at least 600 g/mol and very preferably at least 1000 g/mol. The upper limit for the maximum molecular weight $M_n$ is preferably not more than 5000 g/mol, more preferably not more than 3000 g/mol, and very preferably not more than 2000 g/mol. These compounds must contain alkylene oxide units with at least three carbon atoms in an amount of 40 to 100 mol %, preferably at least 55 mol %, more preferably at least 60 mol %, very preferably at least 65 mol % and, in one particularly preferred embodiment, 100 mol %, based on the total amount of alkylene oxide units. The alkylene oxide units having at least three carbon atoms derive preferably from propylene oxide and butylene oxide. Particular preference is given to the use of polypropylene oxide-based compounds, and very particular preference to monohydroxy-functional polypropylene oxides prepared starting from butanol. A suitable comonomer having less than three carbon atoms is ethylene oxide. These compounds are prepared preferably, as described in the preceding section, by alkoxylation of monohydroxy-functional starter compounds. They preferably contain no polyester fractions, in particular no polyester fractions derived from lactones or hydroxy carboxylic acids, and are preferably free from polymerizable double bonds.

In applications requiring a broad compatibility, as in the universal paste sector, for example, it is frequently advantageous to use addition compounds which are prepared with mixtures of different compounds of the formula (Ia). Where, for example, the addition compounds of the invention are to be used in universal tinting pastes for aqueous and apolar systems, a combination of water-soluble with apolar compounds of the formula (Ia) is an advantage.

The number-average molecular weight $M_n$ of the compound Y—XH is smaller than 20 000 g/mol and is preferably not more than 10 000 g/mol, more preferably not more than 5000 g/mol, very preferably not more than 3500 g/mol, and better still not more than 2000 g/mol. The minimum molecular weight $M_n$ of Y—XH is preferably 100 g/mol, more preferably 150 g/mol, very preferably 200 g/mol, and most preferably 400 g/mol. Preferably less than 50 mol % of the compounds used of formula (Ia) ought to possess a number-average molecular weight of less than 100 g/mol, more preferably less than 25 mol %, very preferably less than 15 mol % and most preferably 0 mol %.

In the reaction with the monofunctional compounds of the formula (Ia), 20% to 90%, preferably 20% to 70% and more preferably 25% to 60% of the free NCO groups originally used are reacted.

Component (b2)

The compounds of the general formula (Ib) G-(XH)$_n$ with n=2 to 4 differ from those of the formula (Ia) essentially in that they contain two, three or four functional groups XH, defined independently of one another, which are reactive towards isocyanates. Of the groups XH, those which are preferred are the same as under formula (Ia). The number-average molecular weight $M_n$ of the compounds of the formula (Ib) is less than 3000 g/mol and it is preferably not more than 2500 g/mol, more preferably not more than 2000 g/mol, very preferably not more than 1500 g/mol. The minimum molecular weight $M_n$ of compounds of the formula (Ib) is preferably 100 g/mol, more preferably 150 g/mol, very preferably 300 g/mol and ideally 600 g/mol.

Examples of di-, tri- and tetra-functional compounds of the formula (Ib) are diols, triols and tetraols and, respectively, diamines, triamines and tetramines without tertiary amino groups having 2 to 12 carbon atoms, dihydroxydialkyl sulphides and dihydroxy sulphones. Examples are butanediol, hexanediol, cyclohexanedimethanol, neopentyl glycol, ethylene glycol, glycerol, trimethylolpropane, pentaerythritol fatty acid dialkanol amides, thiodiglycol di(4-hydroxyphenyl) sulphone, and also hydroxy-functional polybutadienes having an average functionality of 2 to 3. One preferred group of compounds of the formula (Ib) are polyoxyalkylene glycols more preferably having alkylene groups having 2 to 4, very preferably with two, carbon atoms, and preferably having number-average molecular weights $M_n$ in the range from 200 to 2000 g/mol and more preferably 400 to 1500 g/mol. Ethoxylates with 3 hydroxyl groups are obtained, for example, by polymerization using trifunctional alcohols as a starter component. Preferred polyoxyalkylene glycols are polyethylene glycols.

As di-, tri- or tetra-functional compounds of the formula (Ib) it is also possible to use those which can be obtained by polymerizing one or more lactones, as already mentioned, by means of di-, tri- or tetrahydroxy starter components. Preferably these polyesterpolyols have a number-average molecular weight $M_n$ of 500 to 2000 g/mol. A preferred starter component is butanediol or ethylene glycol. Also suitable, however, are the abovementioned diols, triols or tetraols as starter components. Preferably component (b2) contains less than 50 mol %, more preferably less than 20 mol % and very preferably no polyester polyols, in particular no polyester polyols based on lactones or their hydroxycarboxylic acid analogues.

As polyfunctional compounds of the formula (Ib) it is also possible to use polyurethanes, polyether-polyurethanes, polyester-polyurethanes and/or polyether-polyester-polyurethanes, which can be obtained by addition reaction of a diisocyanate with a dihydroxy compound in analogy to the corresponding monofunctional compounds according to formula (Ib). Preferably these urethane-containing compounds according to formula (Ib) have an average functionality of not more than 2 and a number-average molecular weight of 300 to 2500 g/mol, preferably of 500 to 1500 g/mol.

The di-, tri- or tetra-functional compounds of the formula (Ib) produce crosslinking between the reaction products of polyisocyanate and monofunctional compounds of the formula (Ia). The starting products can be used for example in amounts such that the di-, tri- or tetra-functional compounds of the formula (Ib) constitute the centre of the molecule, and such that attached to them are the polyisocyanates whose remaining isocyanate groups have been or are reacted with monofunctional compounds of the formula (I). It is of course also possible for a certain overcrosslinking or undercrosslinking to be present.

In the case of the reaction with the di-, tri- or tetra-functional compounds of the formula (Ib) it is the case that 0% to 60%, preferably 0% to 45% and more preferably 0% to 40% of the NCO groups originally used are reacted.

Particularly preferred products are obtained entirely without the use of di-, tri- or tetra-functional compounds of the formula (I).

In total at least 20%, more preferably at least 25%, and not more than 90%, preferably not more than 80%, more preferably not more than 70%, of the NCO groups of the component (a) polyisocyanate that were originally used are reacted with the compounds of the formula (I).

The reaction of the polyisocyanates with different compounds of the formulae (Ia) and (Ib) can be carried out in one single reaction step or in two or more reaction steps in succession. This can take place in any order. In many cases, however, it is advantageous to react the polyisocyanate in succession with the components in the order first of monofunctional compounds (formula (Ia)) and then of polyfunctional compounds (formula (Ib)). The isocyanate addition can take place, depending on the reactivity of the individual reactants, within the temperature range that is customary for this kind of reaction, from room temperature up to about 150° C. For the purposes of acceleration and reduction of side reactions it is possible to use the customary prior art catalysts such as tertiary amines, for example triethylamine, di-methylcyclohexylamine, N-methylmorpholine, N,N'-di-methylpiperazine, 2-(dimethylaminoethoxy)ethanol, di-azabicyclo [2.2.2]octane and similar compounds, and also, in particular, organometallic compounds such as titanic esters, for example, iron compounds such as iron(III) acetylacetonate, for example, tin compounds, such as tin diacetate, tin dioctoate, tin dilaurate or the dialkyl derivatives of tin dialkyl salts of aliphatic carboxylic acids such as dibutyltin diacetate, dibutyltin dilaurate or the like. These catalysts are customarily used in amounts of 0.0001 to 0.1 part by weight per 100 parts by weight of polyisocyanate.

Component (c1)

Component (c1) is represented by the general formula (IIa) as Z-Q. The group Z is an organic basic radical having at least one tertiary amino group that contains no NCO-reactive groups. The radical Z is preferably an aliphatic or cycloaliphatic group having at least one tertiary amino group, where appropriate in the form of a tertiary ring nitrogen atom of a heterocyclic ring system. The tertiary amino group, or the heterocyclic ring system with tertiary ring nitrogen, may be attached to the group Q directly or via an organic bridging group ("spacer"). The spacer via which the tertiary amino group or the heterocyclic ring system with tertiary ring nitrogen may be attached to the group Q comprises preferably 2 to 10, more preferably 2 to 5, carbon atoms. With particular preference it is an alkylene group having 2 to 10, very preferably 2 to 5, carbon atoms, or a polyether group having the same number of carbon atoms. The group Q stands for $NH_2$, OH or NHR, in which R stands for a linear or branched alkyl group having 1 to 18 carbon atoms.

One group of compounds which can be used as compounds Z-Q of the formula (IIa) is composed of monohydroxy amines having a tertiary amino group, or aliphatic diamines having a tertiary amino group and a primary or secondary amino group, such as, for example, (N,N-diethylamino)ethanol, (N,N-dimethylamino)ethanol, (N,N-dimethylamino)propanol, 2-(diethylamino)ethylamine, 3-(dimethylamino)propylamine, 3-(diethylamino)propylamine, N,N-diethyl-1,4-butanediamine, 1-diethylamino-4-aminopentane, of which 3-(dimethylamino)propylamine and (N,N-diethylamino)ethanol are preferred.

In the case of a further group, Z is a monocyclic or bicyclic heterocyclic group, of which a ring nitrogen atom is attached to the group Q preferably via an alkylene group having 2 to 5 carbon atoms. Preferred heterocycles are triazole, pyrimidine, imidazole, pyridine, morpholine, pyrrolidine, piperazine, piperidine, benzimidazole, benzothiazole and/or triazine and more preferably imidazole and benzimidazole. These heterocycles may contain one or more substituents. They preferably carry one of the following groups: alkyl and/or alkoxy groups having 1 to 6, preferably 1 to 4 carbon atoms (in which case a methoxy group is preferred), or tertiary amino groups.

It is preferred that the heterocyclic groups are attached via a ring nitrogen atom and an alkylene group, preferably with 2 to 5 carbon atoms, to the group Q. The heterocyclic group may of course, besides this ring nitrogen atom, also contain further heteroatoms, including further ring nitrogen atoms.

Further examples of the compounds of the formula (IIa) are N-(3-aminopropyl)imidazole, N-(3-aminopropyl) morpholine, N-(2-aminoethyl)piperidine, 1-methylpiperazine, aminoethylpiperazine. It is characteristic of these compounds that they contain per molecule at least 1 reactive group with at least 1 Zerewitinoff hydrogen atom which is able to react with the NCO groups, and that they additionally possess a nitrogen-containing basic group without reactive hydrogen. These basic groups are characterized in the prior art by their pKa value (cf. U.S. Pat. Nos. 3,817,944; 4,032,698 and 4,070,388). Preference is given to compounds with basic groups having a pKa value of 2 to 14, more preferably of 5 to 14 and very preferably of 5 to 12. The pKa value can be taken from tabular works. The limiting values indicated above refer to the measurement of the pKa value at 25° C. in a 0.01 molar concentration in water. These basic groups likewise endow the addition compounds of the invention with basicity.

Compounds of the formula Z-Q can be obtained, for example, by reacting a (meth)acrylate or epoxide with an amine or nitrogen-containing heterocyclic ring system. Examples of reaction products between a (meth)acrylate and a nitrogen-containing heterocyclic ring system are the reaction products of the hydroxyethyl esters and hydroxypropyl esters of (meth)acrylic acid with the nitrogen-containing heterocyclic ring structure, the following structural elements being attached to the nitrogen of the heterocyclic ring structure:

-propionic acid 2-hydroxyethyl ester, -propionic acid 2-hydroxypropyl ester, -2-methylpropionic acid 2-hydroxyethyl ester and -2-methylpropionic acid 2-hydroxypropyl ester, and ethoxylated and/or propoxylated derivatives thereof. The acrylic esters are preferred.

The reaction with amines proceeds analogously.

Through reaction of an epoxide with an amine or with a nitrogen-containing heterocyclic compound it is likewise possible to prepare the compounds Z-Q. In the course of the reaction, the group Q formed is a secondary hydroxyl group, and a tertiary amino group is formed on the nitrogen atom that takes part in the reaction.

Component (c2)

Compounds M-Q according to formula (IIb) that are used are compounds in which M is an organic radical having a number-average molar mass of not more than 1000 g/mol, preferably not more than 500 g/mol and more preferably 300 g/mol, containing at least one tertiary amino group and at least one OH group, and in which Q is $NH_2$, NHR or OH (where R is a linear or branched alkyl group having 1 to 18 carbon atoms).

M preferably contains 1 to 10, more preferably 1 to 5 and very preferably 1 to 3, such as for example 2, OH groups. Primary OH groups are preferred.

Examples of M-Q with tertiary amino groups and OH groups are triethanolamine, N-methyldiethanolamine, aminopropylmethylethanolamine, 3-(diethylamino)propane-1,2-diol, tetrakis(2-hydroxypropyl)ethylenediamine, bis(2-hydroxyethyl)dodecylamine and bis(2-hydroxyethyl) octadecylamine.

The compounds of component (c2) can be prepared in analogy to the compounds of component (c1) by reaction of (meth)acrylates or epoxides with amines. Where, for example, glycidol is employed as the epoxide, which already contains a primary hydroxyl group, then, by reaction with a secondary amine, a tertiary amine and a secondary hydroxyl group are formed additionally, and so such adducts carry a primary and a secondary hydroxyl group and also a tertiary amino group.

Nitrogen-containing heterocycles can be reacted analogously with (meth)acrylates and epoxides.

For preparing the addition compounds of the invention, it is also possible to use mixtures of different starting materials such as mixtures of (a) polyisocyanates and/or components (b1) and/or (b2) and/or components (c1). Individual representatives of the two or more components (a), (b1), (b2) or (c1) may be used in a superstoichiometric or substoichiometric amount. The proportions, however, are preferably chosen such that the isocyanate groups undergo substantially complete reaction; this means that preferably at least 90%, more preferably at least 95%, very preferably at least 98%, and ideally all of the isocyanate groups have undergone reaction.

By virtue of the basic groups the addition compounds are capable of forming salts. For the purposes of the invention, as dispersants, they can also be used in the form of the corresponding salts. In certain cases, by means of such partial or complete salination it is possible to obtain an improvement in activity and/or an enhanced solubility or compatibility. Even in applications where the basicity of the products is a disrupting factor, as for example, in acid-catalysed systems, it is frequently possible to achieve improvements by means of partial or complete neutralization.

The salts are obtained from the resultant reaction product by neutralization with one or more organic or inorganic acids or by quaternization. The amount of acid to be used is guided by the field of use. Depending on each individual case, the acid components may be used in equimolar, substoichiometric or superstoichiometric amounts. From polycarboxylic acids, for example, it is also possible to use up to one equivalent of polycarboxylic acid per basic group to be neutralized in order to give the products an acidic character. It is preferred to carry out approximately equimolar neutralization. Preference is given to salts with organic carboxylic acids or acidic phosphoric esters. Examples of such acidic phosphoric esters are given in EP 893 155, EP 417 490 and U.S. Pat. No. 5,143,952. Examples of carboxylic acids are aliphatic and/or aromatic carboxylic acids such as short-chain or long-chain fatty acids, formic acid, acetic acid, neodecanoic acid, oleic acid, tall oil fatty acid, stearic acid, ricinoleic acid, natural saturated or unsaturated plant or animal fatty acids and their maleic anhydride adducts, maleic acid, fumaric acid, succinic acid, dodecenylsuccinic acid, 5-norbornene-2,3-dicarboxylic acid, adipic acid, glutaric acid, benzoic acid, nitrobenzoic acid, phthalic acid, tetrahydrophthalic acid, isophthalic acid, terephthalic acid, dimerized or trimerized fatty acids, citric acid and abietic acid.

The addition compounds of the invention preferably contain no ethylenically unsaturated groups.

Furthermore, the addition compounds of the invention are preferably prepared from components which are not lactone-based, especially not caprolactone-based; in other words, from components (a), (b1), optionally (b2), (c1) and optionally (c2), which have themselves been prepared without the use of any lactones, in particular no caprolactones (or the corresponding hydroxycarboxylic acid).

When the polyisocyanates whose use is preferred are employed that have on average at least 2.5 free isocyanate groups, branched, i.e. non-linear, polyurethane structures are formed. Accordingly, non-linear addition compounds are particularly preferred in accordance with the invention.

The preparation of the addition compounds of the invention can be carried out, according to viscosity, in bulk or in the presence of suitable solvents, solvent mixtures or other suitable carrier media. Suitable solvents or carrier media are all those which are not reactive under the chosen reaction conditions or whose reactivity towards the coreactants is negligible and in which the reactants and the reaction products are at least partly soluble. Examples are hydrocarbons such as toluene, xylene, aliphatic and/or cycloaliphatic benzine fractions, chlorinated hydrocarbons such as chloroform, trichloroethane, cyclic and acyclic ethers such as dioxane, tetrahydrofuran, polyalkylene glycol dialkyl ethers such as dipropylene glycol dimethyl ether, esters of monocarboxylic, dicarboxylic or polycarboxylic acids, such as ethyl acetate, butyl acetate, butyrolactone, dimethyl 2-methylglutarate, triacetin, phthalates or other plasticizers, di- or polycarboxylic esters, dialkyl esters of $C_2$ to $C_4$ dicarboxylic acids, referred to as "Dibasic Esters", alkyl glycol esters such as ethyl glycol acetate, methoxypropyl acetate, ketones such as methyl isobutyl ketone, cyclohexanone, acetone, acid amides such as dimethylformamide, N-methylpyrrolidone, and the like. The solvent or solvents and/or carrier media are advantageously selected to take account of the planned field of use. For example, for addition compounds of the invention for use in water-thinnable coating systems, or for coating pigments in aqueous suspension following the pigment synthesis, it is preferred to use solvents which are totally or partly water-dilutable. Where the products are to be used, for example, in applications where the presence of VOCs (volatile organic compounds) is unwanted, the formulation should as far as possible be solvent-free or in appropriately high-boiling carrier media.

Depending on the field of application it is possible for the solvents used for the synthesis to remain in the reaction mixture, or they are fully or partly removed and, where appropriate, replaced by other solvents or carrier media. Depending on compatibility the addition compounds of the invention can also be combined with resins, resin solutions, reactive diluents, binders or other prior art additives, such as other wetting agents and dispersants, anti-settling agents, surface-active additives such as silicones, for example, and the like.

The solvent can be removed, for example, by distillation, where appropriate under reduced pressure, and/or azeotropically with the addition of water, such removal being complete or partial. Alternatively the active substance can be isolated by precipitation, by the addition of non-solvents such as aliphatic hydrocarbons, hexane for example, subsequent separation by filtration, and drying if desired. The active substance obtained by one of these methods can then be diluted in a solvent suitable for the particular field of application, or where appropriate can be used as it is, in the case of powder coating materials for example. If desired, following the addition of suitable high-boiling solvents, the solvent in which the addition product is dissolved can be distilled off, where appropriate under reduced pressure, and/or azeotropically with addition of water, and in this way the addition product can be transferred to a carrier medium that is suitable for the respective field of application.

The reactions can be carried out in the presence of customary catalysts, examples being organotin compounds, such as dibutyltin dilaurate, other organometallic compounds such as iron acetylacetonate, tertiary amines such as triethylenediamine, enzymes or the like.

By varying the substituents of the formula (Ia) in terms of the nature, proportions and/or molecular weights thereof, it is possible to adapt the properties of the addition compounds of the invention to the different fields of application. For example, the solubility and compatibility can be brought into line with a very wide variety of solvents, carrier media, binders, resins, solids and, where appropriate, further polymeric compounds that are present in coating and moulding materials in which the addition compounds according to the invention are employed.

For use in highly polar systems such as water-based coating materials, for example, the radicals Y ought to include a sufficiently high fraction of polar groups, such as polyethylene oxides, for example, in order to achieve a level of water solubility which is sufficient for the particular area of use. This fraction of hydrophilic groups ought also not to be too high, however, if in certain applications this results in an unwanted increase in the sensitivity to water. In one important embodiment the radicals Y of the XH-functionalized polyalkylene oxides are radicals which endow the compounds Y—XH and also, ultimately, the addition compounds of the invention essentially with insolubility in water. Such radicals Y of the XH-functionalized polyalkylene oxides advantageously contain up to a maximum of 28% by weight, preferably up to a maximum of 20% by weight, more preferably up to a maximum of 10% by weight and very preferably up to a maximum of 5% by weight of ethylene oxide units, based on the total amount of alkylene oxide units in the radical Y.

In the case of use in apolar systems such as long-oil alkyd paints, PVC plastisols or polyolefins there should preferably be an appropriate fraction of apolar groups, and in the case of use in systems where broad compatibility is important, such as pigment concentrates, for example, a balanced combination of polar and apolar groups is of advantage.

For dispersing in silicone oils such as decamethylcyclopentasiloxane, for example, for cosmetic preparations for example, polydimethylsiloxane-containing addition compounds in particular are suitable. If the addition compounds are used, for example, in a polyurethane resin or in a coating material whose binder is a polyurethane it is advantageous to use those addition compounds of the invention whose molecule, by virtue of the groups present in the starting compounds of the formulae (Ia) and (Ib), also includes urethane groups or similar groups which, as is known to the skilled person, are compatible with polyurethanes. The same applies, mutatis mutandis, to, for example, polyacrylates, polyesters, alkyd resins, and other polymers.

Mutatis mutandis this also applies to the substituents of components (c1) and (c2), which are of particular influence on the affinity of the addition compounds of the invention for the solids used that are to be dispersed.

Addition compounds of the invention with surface-active substituents may modify the surface tension of the substrates produced using them. If, for instance, very apolar groups such as long-chain alkyl groups having more than 12 carbon atoms, polydimethylsiloxane-containing and/or perfluoroalkyl-containing groups are present, for example, the products are suitable for reducing the surface tension of liquid organic or aqueous systems or of solid systems, and for influencing the associated properties such as, for example, wetting properties, stainability, printability, flow and foam behaviour. In systems which exhibit reactivity with OH groups, COOH groups and/or double bonds, examples being 2-component systems based on isocyanate or on melamine resin, epoxide-containing systems, radiation-curing coatings, such as UV-curing or electron-beam-curing paints and printing inks, or unsaturated polyester systems, for example, co-crosslinking can be achieved through the use of addition compounds of the invention containing reactive groups such as OH groups, COOH groups and/or unsaturated groups, and leads to improvements in adhesion, incorporation of solids, mechanical properties and migration behaviour. In applications where the presence of double bonds leads to unwanted disadvantages such as discoloration, as a result for example of high processing temperatures, it is advantageous to use addition compounds of the invention with as few unsaturated groups as possible and preferably none at all.

The number-average molecular weight $M_n$ of the addition compounds of the invention is preferably at least 500 g/mol, more preferably at least 800 g/mol, very preferably at least 1200 g/mol and ideally at least 2000 g/mol.

The invention also provides a process for preparing the addition compounds of the invention, which comprises reacting (a) one or more polyisocyanates having at least two isocyanate groups per molecule with (b1) one or more compounds of the formula (Ia)

where

XH is a group that is reactive towards isocyanates and

Y is a monomeric or polymeric group that is not reactive towards isocyanates, that contains no tertiary amino groups and that comprises one or more aliphatic, cycloaliphatic and/or aromatic groups, the compound of the general formula (Ia) possessing a number-average molar mass $M_n$ of less than 20 000 g/mol and at least 55 mol % of the compounds of the formula (Ia) possessing a number-average molecular weight $M_n$ of 150 to 10 000 g/mol and which represent XH-functionalized polyalkylene oxides which contain 40 to 100 mol % of alkylene oxide units having at least three carbon atoms, based on the total amount of alkylene oxide units, with the proviso that 20% to 90% of the isocyanate groups of component (a) are reacted with the compounds of the formula (Ia), (b2) one or more compounds of the formula (Ib)

where n is 2 to 4 and G is an aliphatic, cycloaliphatic and/or aromatic group which contains at least 2 carbon atoms, has no tertiary amino groups and has a number-average molecular weight $M_n$ of not more than 3000, and which can contain —O—, —COO—, —CONH—, —S— and/or —SO$_2$— groups, are reacted in an amount such that 0% to 60%, preferably 0 to 45% and more preferably 0 to 40% of the NCO groups of the polyisocyanates originally used are reacted, with the proviso that, as a result of the reactions (b1) and (b2), a total of at least 20% and not more than 90%, preferably 30 to 65% and more preferably 40 to 60% of the isocyanate groups of the polyisocyanates originally used have undergone reaction, and (c1) one or more compounds of the general formula (IIa)

$$Z\text{-}Q \qquad \text{(IIa)}$$

in which Q is —NH$_2$, —NHR or OH, in which R is a linear or branched alkyl group having 1 to 18 carbon atoms, and Z is an organic basic radical having at least one tertiary amino group and containing no isocyanate-reactive groups, and (c2) optionally one or more compounds of the general formula (IIb)

$$M\text{-}Q \qquad \text{(IIb)}$$

in which Q is —NH$_2$, —NHR or OH, in which R is a linear or branched alkyl group having 1 to 18 carbon atoms, and M is an organic radical having a number-average molar mass of not more than 1000 g/mol, with at least one tertiary amino group and at least one hydroxyl group, with the proviso that at least 10% of the isocyanate groups of component (a) are reacted with component (c1).

The components (a), (b1), (b2), (c1) and (c2) that are used in the process of the invention correspond to those already described earlier on above.

The process of the invention is preferably carried out such that first of all the compounds of component (a) are reacted with those of component (b1) and, if used, (b2) and only then are the remaining isocyanate groups reacted with the compounds of component (c1).

It is further advantageous, first to react the compounds of the formula (Ia) of component (b1) with the polyisocyanate component (a) and only then to carry out a reaction with the compounds of the formula (Ib) of component (b2).

The invention further provides for the use of the above-described addition compounds of the invention as wetting agents and dispersants and as dispersion stabilizers.

The invention further provides pulverous or fibrous solids intended for incorporation into liquid systems and coated with these addition compounds as dispersants and as dispersion stabilizers or as wetting agents.

The addition compounds of the invention can be used in dispersants, dispersion stabilizers or wetting agents in place of their prior art counterparts. Thus, for example, they can be used in the preparation or processing of paints, printing inks, other inks, for example inkjet inks, paper coatings, leather and textile colours, pastes, pigment concentrates, ceramics, and cosmetic preparations, particularly if they contain solids such as pigments and/or fillers. They can also be employed in connection with the preparation or processing of moulding compositions based on synthetic, semi-synthetic or natural macromolecular substances, such as polyvinyl chloride, saturated or unsaturated polyesters, polyurethanes, polystyrenes, polyacrylates, polyamides, epoxy resins, polyolefins such as polyethylene or polypropylene, for example. By way of example it is possible to use the addition compounds for preparing casting compositions, PVC plastisols, gelcoats, polymer concrete, printed circuit boards, industrial paints, wood and furniture varnishes, vehicle finishes, marine paints, anti-corrosion paints, can coatings and coil coatings, decorating paints and architectural paints, where binders and/or solvents, pigments and optionally fillers, the addition compound, and typical auxiliaries are mixed.

The addition compounds are used preferably for producing pigment- and/or filler-comprising pigment concentrates, paints, pastes and/or moulding compositions.

Examples of typical binders are resins based on polyurethanes, cellulose nitrates, cellulose acetobutyrates, alkyds, melamines, polyesters, chlorinated rubbers, epoxides and acrylates. Examples of water-based coatings are cathodic or anodic electrodeposition coatings for car bodies, for example. Further examples are renders, silicate paints, emulsion paints, aqueous paints based on water-dilutable alkyds, alkyd emulsions, hybrid systems, 2-component systems, polyurethane dispersions and acrylate dispersions.

The addition compounds of the invention are particularly suitable as well for preparing concentrates of solids, such as pigment concentrates, for example. For that purpose the compounds of the invention are initially introduced in a carrier medium such as organic solvents, plasticizers and/or water, and the solids to be dispersed are added with stirring. Additionally these concentrates may include binders and/or other auxiliaries. With the addition compounds of the invention, however, it is possible in particular to prepare stable binder-free pigment concentrates. It is also possible using the compounds of the invention to prepare fluid concentrates of solids from pigment presscakes. In this case the compound of the invention is admixed to the presscake, which may additionally contain organic solvents, plasticizers and/or water, and the resulting mixture is dispersed. Prepared in their different ways, the concentrates of solids can then be incorporated into different substrates such as, for example, alkyd resins, polyester resins, acrylate resins, polyurethane resins or epoxy resins. Pigments can also, however, be dispersed directly in the addition compounds of the invention, without solvent, and are then particularly suitable for pigmenting thermoplastic and thermoset polymer formulations.

The addition compounds of the invention can also be used with advantage in connection with the production of colour filters for liquid-crystal displays, liquid-crystal screens, colour resolution devices, sensors, plasma screens, displays based on SED (Surface conduction Electron emitter Display) and for MLCC (Multi-Layer Ceramic Compounds). The MLCC technology is used in connection with the production of microchips and printed circuit boards.

The addition compounds of the invention can also be used to produce cosmetic preparations such as, for example, makeup, powder, lipsticks, hair colorants, creams, nail varnishes and sun protection products. These may be present in the customary forms, as for example W/O or O/W emulsions, solutions, gels, creams, lotions or sprays. The addition compounds of the invention can be used with advantage in dispersions that are used for preparing these preparations. These dispersions may contain the carrier media that are typical for these purposes in cosmetology, such as, for example, water, castor oils or silicone oils, and solids, such as organic and inorganic pigments such as titanium dioxide or iron oxide, for example.

The invention also provides, furthermore, for the use of an addition compound of the invention for preparing a pigmented paint which serves in particular for producing a pigmented coating on a substrate, the pigmented paint being applied to the substrate and the pigmented paint which has been applied to the substrate being baked or cured and/or crosslinked.

The dispersants can be used alone or together with customary prior art binders. For use in polyolefins, for example, it can be advantageous to use corresponding polyolefins of low molecular mass as carrier materials, together with the dispersant.

One inventive use of the addition compounds is in the preparation of dispersible solids in powder particle and/or fibre particle form, particularly of dispersible pigments or plastics fillers, the particles being coated with the inventive addition compound. Coatings of this kind of organic and inorganic solids are performed in a known way, as described in EP-A-0 270 126, for example. In this case the solvent or emulsion medium can either be removed or remain in the mixture, with the formation of pastes. These pastes are customary commercial products and may additionally include binder fractions and also further auxiliaries and additives. Specifically in the case of the pigments it is possible for the pigment surface to be coated during or after the synthesis of the pigments, by the addition, for example, of the addition products of the invention to the pigment suspension or during or after the pigment finish. The pigments pretreated in this way are distinguished by greater ease of incorporation and also by improved viscosity, flocculation and gloss behaviour and by higher colour strength as compared with untreated pigments.

Besides the above-described application, as dispersants and/or coating materials for pulverous and fibrous solids, the addition compounds of the invention can also be used as viscosity reducers and compatibilizers in synthetic resins. Examples of such synthetic resins are those known as sheet moulding compounds (SMC) and bulk moulding compounds (BMC), which are composed of unsaturated polyester resins with high filler and fibre contents. Their preparation and processing are described by way of example in DE-A-36 43007. One problem affecting SMC and BMC synthetic resin mixtures is that often polystyrene (PS) is added to the formulation in order to reduce contraction during the processing operation. PS is not compatible with the unsaturated polyester resins used, and separation of the components occurs. When PS-filled SMC or BMC mixtures are being used, the additives of the invention, by virtue of their good dispersing qualities, are able to bring about compatibilization between PS and unsaturated polyester resin, thereby increasing the storage stability and processing reliability of such mixtures.

In many cases, including for example in incompatible polyol mixtures, polyol/isocyanate mixtures or polyol/blowing agent mixtures used for polyurethane production, through the addition compounds of the invention it is possible wholly or partly to prevent the separation problems which result from this incompatibility and affect dispersions, especially emulsions.

The addition compounds of the invention are added preferably in an amount of 0.01% to 10% by weight, based on the total formulation amount. Based on the solid to be dispersed, they are used in an amount of preferably 0.5% to 100% by weight. Where difficult-to-disperse solids are used, the amount of inventive addition compound employed may well be higher. The amount of dispersant is generally dependent on the surface that is to be coated of the substance that is to be dispersed. For example, if titanium dioxide is used as a pigment, the amount of dispersant is lower than in the case of, say, carbon black. Generally speaking, the amount of dispersant needed to disperse inorganic pigments is less than for organic pigments, since the latter have a higher specific surface area and, consequently, a greater amount of dispersant is needed. Typical addition levels for inorganic pigments are 1-10% by weight, for organic pigments 10-30% by weight (in each case expressed as active substance of addition compound relative to pigment). In the case of very finely divided pigments (e.g. some carbon blacks), amounts of 30-80% by weight or more need to be added, even.

As a criterion of sufficient pigment stabilization it is possible for example to employ colour strength, gloss and transparency of the pigment dispersion or the degree of floating (rub-out test) in the case of a white reduction.

The dispersing of the solids may take place as a single dispersion or else as a mixed dispersion with two or more pigments simultaneously, the best results generally being achievable with single dispersions. When mixtures of different solids are used, opposing charges on the surfaces of the solids may result in an increased incidence of agglomeration in the liquid phase. In these cases it is frequently possible, using the addition compounds of the invention, to achieve a charge of equal sign, generally a positive charge, for all of the particles and hence to avoid instabilities due to charge differences. The dispersants achieve their optimum effect when added to the millbase, particularly if first of all the solid to be dispersed is mixed only with the additive and, where appropriate, solvents ("premix"), since in that case the additive is able to adsorb preferentially onto the surface of the solid, without having to compete with the binder polymers. In practice, however, this procedure is necessary only in exceptional cases. If necessary, the addition compounds can also be employed subsequently (as what are called "post-additives"), in order, for example, to solve floating or flocculation problems in a batch which has already been let down. Generally speaking, however, increased levels of addition of additive are necessary in this case.

In certain cases the addition compounds of the invention may exert a more or less pronounced influence on the rheology of the system. In such cases, therefore, they can also be used for rheology control, where appropriate in combination with other rheological additives such as fumed silica, phyllosilicates (bentonites), hydrogenated castor oils, or the additives BYK®-410, BYK®-420 and BYK®-425 (BYK Chemie GmbH). In these cases, synergistic effects are frequently observed. In many cases it is also possible to improve the corrosion control properties of coatings through the use of the addition compounds of the invention.

Examples of pulverous or fibrous solids are those which may be coated with dispersants, especially organic and inorganic pigments which are used in paints, coating materials, moulding compositions or other plastics, and organic or inorganic fillers which are used to fill or reinforce paints, coating materials, moulding compositions or other plastics. A subgroup of such fillers are fibres of organic and/or inorganic type which are likewise used as fillers or reinforcing substances.

Examples of pigments are mono-, di-, tri- and poly-azo pigments, oxazine, dioxazine and thiazine pigments, diketopyrrolopyrroles, phthalocyanines, ultramarine and other metal complex pigments, indigoid pigments, diphenylmethane, triarylmethane, xanthene, acridine, quinacridone and methine pigments, anthraquinone, pyranthrone, perylene and other polycyclic carbonyl pigments, inorganic pigments based on carbon black, graphite, zinc, titanium dioxide, zinc oxide, zinc sulphide, zinc phosphate, barium sulphate, lithopones, iron oxide, ultramarine, manganese phosphate, cobalt aluminate, cobalt stannate, cobalt zincate, antimony oxide, antimony sulphide, chromium oxide, zinc chromate, mixed metal oxides based on nickel, bismuth, vanadium, molybdenum, cadmium, titanium, zinc, manganese, cobalt, iron, chromium, antimony, magnesium, aluminium (for example nickel titanium yellow, bismuth vanadate, molybdate yellow or chromium titanium yellow), magnetic pigments based on pure iron, iron oxides and chromium oxides or mixed oxides, metallic pigments comprising aluminium, zinc, copper or brass, and also pearlescent pigments, and fluorescent and phosphorescent luminescent pigments. All of the aforementioned pigments may be in surface-modified form and may possess basic, acidic or neutral groups on the surface. Preference is given to neutral or acidically modified pigments, such as oxidized carbon blacks, for example.

Further examples are nanoscale organic or inorganic solids having particle sizes below 100 nm, such as certain grades of carbon black, or particles composed of a metal or semimetal oxide or hydroxide, and also particles composed of mixed metal and/or semimetal oxides and/or hydroxides. By way of example it is possible to employ the oxides and/or oxide hydroxides of aluminium, silicon, zinc, titanium, etc. in order to prepare extremely finely divided solids of this kind. These oxidic, hydroxidic or oxide-hydroxidic particles may be prepared by any of a wide variety of methods such as, for example, ion-exchange operations, plasma operations, sol-gel processes, precipitation, comminution (by grinding, for example) or flame hydrolysis, and the like.

Examples of pulverous or fibrous fillers are, for example, those composed of pulverous or fibrous particles of aluminium oxide, aluminium hydroxide, silicon dioxide, kieselguhr, siliceous earth, quartz, silica gel, talc, kaolin, mica, perlite, feldspar, slate flour, calcium sulphate, barium sulphate, calcium carbonate, calcite, dolomite, glass or carbon. Further examples of pigments or fillers are found for example in EP-A-0 270 126. Additionally flame retardants such as, for example, aluminium hydroxide or magnesium hydroxide, and matting agents such as silicas, for example, can likewise be dispersed and stabilized outstandingly.

In the text below, the present invention is further illustrated by examples which follow.

EXAMPLES

In the case of substances without molecular uniformity the stated molecular weights—below as already in the foregoing description—represent average values of the numerical mean. The molecular weights or number-average molecular weights $M_n$, are determined, when titratable hydroxyl or amino groups are present, by end-group determination via the determination of the OH number or amine number, respectively. In the case of compounds to which an end-group determination cannot be applied, the number-average molecular weight is determined by means of gel permeation chromatography against a polystyrene standard.

Unless otherwise remarked, parts are parts by weight and percentages are percentages by weight.

The free NCO content of the polyisocyanates employed and also the course of the NCO addition reactions, are determined in accordance with EN ISO 9369 by reaction with butylamine and subsequent titration of the amine excess. These methods are also described in Saul Patai's "The Chemistry of Cyanates and their Thio Derivatives", Part 1, Chapter 5, 1977.

The hydroxy-functional caprolactone polyesters are prepared as described in EP 158678, for example.

PREPARATION EXAMPLES

Example 1

Non-Inventive, Comparative Example 28.1 parts of polyisocyanate P1 are homogenized with 38.5 parts of BCPE1100 and 22.7 parts of PMA (methoxypropyl acetate). The mixture is heated to 80° C. under inert gas, and 0.003 part of DBTL (dibutyltin dilaurate) is added. The mixture is stirred at this temperature for about an hour until 65% of the NCO groups used have undergone reaction. Then 2 parts of DMAPA are added and stirring is continued at 80° C. until all of the NCO groups have been consumed by reaction. The product is of medium viscosity, and has a solids content of 60% and an amine number of 12 mg KOH/g. After a few days at 20° C. the product shows strong formation of crystals.

In aromatic-free white spirit the product is insoluble.

Example 2

In analogy to Example 1, 38.5 parts of BPO1100 are used instead of BCPE1100. The solids content is 60% and the amine number is 12 mg KOH/g. On storage, the product remains homogeneous and liquid. Even on prolonged storage below 0° C. there is no crystal formation.

In aromatic-free white spirit it is possible to prepare a clear, 10% solution.

Example 3

In analogy to Example 2, 1.7 parts of DMEA are used instead of DMAPA. The solids content is 60% and the amine number is 12 mg KOH/g.

Example 4

In analogy to Example 2, 2.5 parts of API are used instead of DMAPA. The solids content is 60% and the amine number is 12 mg KOH/g.

Example 5

In analogy to Example 2, 2.3 parts of DEEA are used instead of DMAPA. The solids content is 60% and the amine number is 12 mg KOH/g.

Example 6

15.7 parts of polyisocyanate P1 are homogenized with 9.9 parts of BPO1100 and 46.9 parts of PMA. The mixture is heated to 60° C. under inert gas, and 0.001 part of DBTL is added. After about an hour, 30% of the NCO groups used have undergone reaction. Then 1.3 parts of a PEG400 are added. Stirring is continued at 60° C. until a further 21% of the NCO groups used have undergone reaction. Then 1.9 parts of API and 24.5 parts of N-methylpyrrolidone are added and stirring is continued at 80° C. until the remaining NCO groups have been consumed by reaction. The product possesses an amine number of 8 mg KOH/g and a solids of 23%.

Example 7

15.7 parts of polyisocyanate P1 are homogenized with 9.9 parts of BPO1100 and 46.9 parts of PMA. The mixture is heated to 60° C. under inert gas, and 0.001 part of DBTL is added. After about an hour, 30% of the NCO groups used have undergone reaction. Then 3.15 parts of a PEG1000 are added. Stirring is continued at 60° C. until a further 21% of the NCO groups used have undergone reaction. Then 1.9 parts of API and 24.5 parts of N-methylpyrrolidone are added and stirring is continued at 80° C. until the remaining NCO groups have been consumed by reaction. The product possesses an amine number of 8 mg KOH/g and a solids of 23%.

Example 8

24 parts of polyisocyanate P1 are homogenized with 25.6 parts of BPO1400 and 26 parts of PMA and 41.3 parts of ethyl acetate. The mixture is heated to 65° C. under inert gas, and 0.002 part of DBTL is added. After an hour, 40% of the NCO groups used have undergone reaction. Then 1.5 parts of a PEG600 are added. Stirring is continued at 65° C. until a further 11% of the NCO groups used have undergone reaction. Then 2.3 parts of DMAPA are added and stirring is carried out at 70° C. until the remaining NCO groups have been consumed by reaction. The product is of low viscosity and possesses a solids content of 35% and an amine number of 10 mg KOH/g.

Example 9

29.6 parts of polyisocyanate P1, 26.2 parts of ethyl acetate and 0.001 part of DBTL are admixed slowly dropwise over an hour at 80° C. with 24 parts of BPO700. When 60% of the NCO groups used have been consumed by reaction, 2.7 parts of DMEA are added. When the remaining NCO groups have been consumed by reaction, the batch is diluted with 17.4 parts of propylene glycol monomethyl ether (PM). The product is of medium viscosity and possesses a solids content of 43% and an amine number of 11 mg KOH/g.

Example 10

29.6 parts of polyisocyanate P1, 50 parts of PMA and 0.001 part of DBTL are admixed slowly dropwise over an hour at 80° C. with 37.2 parts of BPO1100. When 60% of the NCO groups used have been consumed by reaction, 2.3 parts of DMAPA are added. When the remaining NCO groups have been consumed by reaction, the batch is diluted with 17.4 parts of tripropylene glycol monomethyl ether (TPM). The product is of medium viscosity and possesses a solids content of 40% and an amine number of 9 mg KOH/g.

Example 11

29.6 parts of polyisocyanate P1, 65.3 parts of PMA and 0.001 part of DBTL are admixed slowly dropwise over an hour at 80° C. with 47.4 parts of BPO1400. When 60% of the NCO groups used have been consumed by reaction, 2.3 parts of DMAPA are added. When the remaining NCO groups have been consumed by reaction, the batch is diluted with 17.4 parts of dipropylene glycol monomethyl ether (DPM). The product is of medium viscosity and possesses a solids content of 40% and an amine number of 8 mg KOH/g.

Example 12

29.6 parts of polyisocyanate P3, 80.4 parts of PMA and 0.001 part of DBTL are admixed slowly dropwise over an hour at 80° C. with 57.5 parts of BPO1700. When 60% of the NCO groups used have been consumed by reaction, 2.3 parts of DMAPA are added. When the remaining NCO groups have been consumed by reaction, the batch is diluted with 17.4 parts of dipropylene glycol monomethyl ether (DPM). The product is of medium viscosity and possesses a solids content of 40% and an amine number of 7 mg KOH/g.

Example 13

14.4 parts of polyisocyanate P2, 37 parts of PMA and 0.003 part of DBTL are admixed slowly dropwise over 4 hours at 80° C. with 41 parts of BPO1100. When 50% of the NCO groups used have been consumed by reaction, 4.7 parts of API are added. When the remaining NCO groups have been consumed by reaction, the batch is diluted with 3 parts of dipropylene glycol monomethyl ether (DPM). The product is of medium viscosity and possesses a solids content of 60% and an amine number of 21 mg KOH/g.

Key:
P1=aromatic TDI polyisocyanurate having a free NCO content of 8.0% as a 51% strength solution in butyl acetate, e.g. Desmodur® IL, Bayer AG
P2=aliphatic polyisocyanate (HDI trimer) having a free NCO content of 21.8%, e.g. Desmodur® N3300, Bayer AG
P3=aromatic TDI polyisocyanurate having a free NCO content of 8.0%; as a 51% strength solution in ethyl acetate, e.g. Desmodur® IL EA, Bayer AG
BCPE1100=monohydroxy-functional ε-caprolactone polyester, prepared starting from butanol, average molecular weight Mn 1100
BPO700, 1100, 1400=monohydroxy-functional PO polyether, prepared starting from butanol, average molecular weight Mn=700, 1100 or 1400. The term "PO" stands for propylene oxide.
PEG 400, 600, 1000=polyethylene glycol (dihydroxy-functional), average molecular weight Mn 400, 600 or 1000
DMEA=N,N-dimethylaminoethanol
API=aminopropylimidazole
DEEA=N,N-diethylaminoethanol
DMAPA=N,N-dimethyl-3-aminopropylamine.

Use Examples

Use in Paste System

| Pigment paste with Spezialschwarz 4: | |
|---|---|
| Laropal A81 65% strength in PMA | 23.50 parts |
| PMA | 22.90 parts |
| Inventive addition compound | 19.60 parts |
| Carbon black, e.g. Spezialschwarz 4 (Degussa AG) | 34.00 parts |
| | 100.00 parts |
| +10% PMA | |

Dispersion: Dispermat CV/60 min/10 000 rpm/40° C./1 mm beads 1:1

Pigment Paste Spezialschwarz 4, Prepared with Examples 2, 3 and 4

| Evaluation of paste viscosity-visual: | |
|---|---|
| Additive: | Evaluation: |
| Example 2 | 1 |
| Example 3 | 2 |
| Example 4 | 1 |

Rating: 1 = low viscosity, 3 = medium viscosity, 5 = pasty

The invention claimed is:
1. Addition compounds and salts thereof, wherein the addition compounds are obtainable by reacting

(a) one or more polyisocyanates having at least three isocyanate groups per molecule wherein the polyisocyanates are products, containing one or more isocyanurate groups, of diisocyanates based on at least one of hexamethylene diisocyanate, diisophorone diisocyanate, and tolylene diisocyanate
with
(b1) one or more compounds of the formula (Ia)

$$Y—XH \qquad (Ia)$$

where
XH is a group that is reactive towards isocyanates and
Y is a monomeric or polymeric group that is not reactive towards isocyanates, that contains no tertiary amino groups and that comprises one or more aliphatic, cycloaliphatic and/or aromatic groups, that may optionally contain the heteroatoms O, S, Si and/or N and/or ether, urethane, carbonate, amide, siloxane and/or ester groups, and, wherein hydrogen may optionally be replaced by halogen;
the compound of the general formula (Ia) possessing a number-average molar mass $M_n$ of less than 20 000 g/mol and
at least 75 mol % of the compounds of the formula (Ia) possessing a number-average molecular weight $M_n$ of 150 to 10 000 g/mol
and which represent XH-functionalized polyalkylene oxides which contain 40 to 100 mol % of at least one of propylene oxide and butylene oxide units,
with the proviso that 20% to 90% of the isocyanate groups of component (a) are reacted with the compounds of the formula (Ia),
(b2) one or more compounds of the formula (Ib)

$$G\text{-}(XH)_n \qquad (Ib)$$

where n is 2 to 4 and G is an aliphatic, cycloaliphatic and/or aromatic group which contains at least 2 carbon atoms, has no tertiary amino groups and has a number-average molecular weight Mn of not more than 3000, reacted in an amount such that 0% to 60% of the isocyanate groups of the polyisocyanates originally used are reacted,
with the proviso that, as a result of the reactions (b1) and (b2), a total of at least 20% and not more than 90% of the isocyanate groups of the polyisocyanates originally used have undergone reaction,
(c1) one or more compounds of the general formula (IIa)

$$Z\text{-}Q \qquad (IIa)$$

in which Q is —NH$_2$, —NHR or OH, in which R is a linear or branched alkyl group having 1 to 18 carbon atoms, and
Z is an organic basic radical having at least one tertiary amino group and containing no isocyanate-reactive groups,
wherein Z is A) at least one of an aliphatic and cycloaliphatic group having at least one tertiary amino group, or B) a heterocyclic group having at least one basic ring nitrogen atom that does not contain a hydrogen atom, it being possible for the heterocyclic group to be attached to the group Q via an organic coupling group,
and
(c2) optionally one or more compounds of the general formula (IIb)

$$M\text{-}Q \qquad (IIb)$$

in which Q is —NH$_2$, —NHR or OH, in which R is a linear or branched alkyl group having 1 to 18 carbon atoms, and
M is an organic radical having a number-average molar mass of not more than 1000 g/mol, with at least one tertiary amino group and at least one hydroxyl group,
with the proviso that at least 10% of the isocyanate groups of component (a) are reacted with component (c1).

2. The addition compounds according to claim 1, where Y contains, the heteroatoms O, S, Si and/or N and/or ether, urethane, carbonate, amide, siloxane and/or ester groups, and, wherein hydrogen is replaced by halogen.

3. The addition compounds according to claim 1, where at least two different compounds of the formula (Ia) are used.

4. The addition compounds and salts thereof according to claim 1 wherein some of the monofunctional compounds of the formula (Ia) are monohydroxy-functional polyethers, polyesters, polyether-polyesters and/or aliphatic and/or cycloaliphatic monoalcohols having 2 to 30 carbon atoms, some of whose hydrogen atoms have been replaced by halogen and/or aryl radicals.

5. The addition compounds according to claim 1, wherein di-, tri- or tetrahydroxy-functional polyethers, polyesters or polyether-polyesters are used as polyfunctional compounds of the formula (Ib).

6. The addition compounds according to claim 1, wherein they contain no unsaturated groups.

7. A process for preparing the addition compounds according to claim 1, comprising reacting
(a) one or more polyisocyanates having at least three isocyanate groups per molecule with
(b1) one or more compounds of the formula (Ia)

$$Y—XH \qquad (Ia)$$

where
XH is a group that is reactive towards isocyanates and
Y is a monomeric or polymeric group that is not reactive towards isocyanates, that contains no tertiary amino groups and that comprises one or more aliphatic, cycloaliphatic and/or aromatic groups, that may optionally contain the heteroatoms O, S, Si and/or N and/or ether, urethane, carbonate, amide, siloxane and/or ester groups, and, wherein hydrogen may optionally be replaced by halogen;
the compound of the general formula (Ia) possessing a number-average molar mass $M_n$ of less than 20 000 g/mol and
at least 55 mol % of the compounds of the formula (Ia) possessing a number-average molecular weight $M_n$ of 150 to 10 000 g/mol
and which represent XH-functionalized polyalkylene oxides which contain 40 to 100 mol % at least one of propylene oxide and butylene oxide units,
with the proviso that 20% to 90% of the isocyanate groups of component (a) are reacted with the compounds of the formula (Ia),
(b2) one or more compounds of the formula (Ib)

$$G\text{-}(XH)_n \qquad (Ib)$$

where n is 2 to 4 and G is an aliphatic, cycloaliphatic and/or aromatic group which contains at least 2 carbon atoms, has no tertiary amino groups and has a number-average molecular weight $M_n$ of not more than 3000 g/mol, reacted in an amount such that 0% to 60% of the isocyanate groups of the polyisocyanates originally used are reacted, with the proviso that, as a result of the reactions (b1) and (b2), a total of at least 20% and not more than 90% of the isocyanate groups of the polyisocyanates originally used have undergone reaction, (c1) one or more compounds of the general formula (IIa)

$$Z-Q \quad \text{(IIa)}$$

in which Q is —NH$_2$, —NHR or OH, in which R is a linear or branched alkyl group having 1 to 18 carbon atoms, and Z is an organic basic radical having at least one tertiary amino group and containing no isocyanate-reactive groups, and (c2) optionally one or more compounds of the general formula (IIb)

$$M-Q \quad \text{(IIb)}$$

in which Q is —NH$_2$, —NHR or OH, in which R is a linear or branched alkyl group having 1 to 18 carbon atoms, and M is an organic radical having a number-average molar mass of not more than 1000 g/mol, with at least one tertiary amino group and at least one hydroxyl group, with the proviso that at least 10% of the isocyanate groups of component (a) are reacted with component (c1).

8. The process for preparing an addition compound according to claim 7, where first of all component (a) is reacted with component (b1) and, where appropriate, (b2), and then a reaction takes place with component (c1).

9. The process for preparing an addition compound according to claim 7, where component (a) is reacted first with compounds of the general formula (Ia) where n is 1 and then with compounds of the general formula (Ib) where n is 2 to 4.

10. Use of one of the addition compounds of claim 1, prepared by the process according to claim 9 as a dispersant, dispersion stabilizer and/or wetting agent.

11. Use of one of the addition compounds of claim 1, prepared by the process according to claim 9 in the preparation or processing of paints, inks, including printing inks, paper coatings, leather and textile colours, pastes, pigment concentrates, ceramics, cosmetic preparations, casting compositions and/or moulding compositions based on synthetic, semi-synthetic or natural macromolecular substances.

12. Use of one of the addition compounds of claim 1, prepared by the process according to claim 9 for preparing pigment- and/or filler-comprising pigment concentrates, paints, pastes and/or moulding compositions.

13. Use of one of the addition compounds of claim 1, prepared by the process according to claim 9 for coating solids in powder particle and/or fibre particle form.

14. Use of an addition compound according to claim 13, the solids in powder particle and/or fibre particle form being dispersible pigments and/or fillers.

15. Use of one of the addition compounds of claim 1, prepared by the process according to claim 9 for preparing a pigmented paint.

16. Use of an addition compound of claim 1, prepared by the process according to claim 9 for producing a pigmented coating on a substrate, the addition compound being used to prepare a pigmented paint, the pigmented paint being applied to the substrate, and the pigmented paint applied to the substrate being baked or cured or crosslinked.

17. Solids in powder particle and/or fibre particle form, wherein they are coated with an addition compound of claim 1, prepared by the process according to claim 7.

18. Solids in powder particle and/or fibre particle form according to claim 17, the solids in powder particle and/or fibre particle form being pigments and/or fillers.

19. The addition compounds according to claim 1, wherein the XH-functionalized polyalkylene oxides contain 65 to 100 mol % of at least one of propylene oxide and butylene oxide units.

20. The addition compounds according to claim 1, wherein Z is an aliphatic having at least one tertiary amino group.

21. The addition compounds according to claim 1, wherein Z is a heterocyclic group having at least one basic ring nitrogen atom that does not contain a hydrogen atom selected from the group consisting of triazole, pyrimidine, imidazole, pyridine, morpholine, pyrrolidine, piperazine, piperidine, benzimidazole, benzothiazole and/or triazine.

22. The addition compounds according to claim 1, wherein Q is —NH$_2$ or OH.

* * * * *